United States Patent
Mandal et al.

(10) Patent No.: US 9,854,038 B2
(45) Date of Patent: Dec. 26, 2017

(54) DATA REPLICATION USING EPHEMERAL TREE STRUCTURES

(71) Applicant: Facebook, Inc., Menlo Park, CA (US)

(72) Inventors: Mainak Mandal, Foster City, CA (US); Janusz Jakub Kudelka, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 233 days.

(21) Appl. No.: 14/860,256

(22) Filed: Sep. 21, 2015

(65) Prior Publication Data
US 2017/0085640 A1   Mar. 23, 2017

(51) Int. Cl.
G06F 15/173 (2006.01)
H04L 29/08 (2006.01)

(52) U.S. Cl.
CPC ........ H04L 67/1095 (2013.01); H04L 67/104 (2013.01); H04L 67/1097 (2013.01)

(58) Field of Classification Search
CPC H04L 67/1095; H04L 67/1097; H04L 67/104
See application file for complete search history.

(56) References Cited

U.S. PATENT DOCUMENTS

| | | | | |
|---|---|---|---|---|
| 6,151,633 A * | 11/2000 | Hurst | ..................... | H04L 1/1867 370/229 |
| 6,971,110 B1 * | 11/2005 | Marks | ..................... | G06F 9/4445 718/106 |
| 8,312,242 B2 * | 11/2012 | Casper | .............. | G06F 17/30067 711/170 |
| 2003/0069900 A1 * | 4/2003 | Hind | ..................... | G06Q 10/107 |
| 2004/0111441 A1 * | 6/2004 | Saito | .................. | G06F 17/30206 |
| 2004/0168174 A1 * | 8/2004 | Baker | ..................... | H04L 67/10 719/310 |
| 2004/0190635 A1 * | 9/2004 | Ruehle | ..................... | H04B 1/66 375/253 |
| 2009/0282160 A1 * | 11/2009 | Wang | ..................... | H04L 12/18 709/231 |
| 2009/0307336 A1 * | 12/2009 | Hieb | ..................... | H04J 3/0679 709/220 |
| 2011/0066297 A1 * | 3/2011 | Saberi | ................... | F16K 31/046 700/287 |
| 2012/0147885 A1 * | 6/2012 | Johri | ................... | H04L 12/1854 370/390 |
| 2015/0046532 A1 * | 2/2015 | Szczytowski | ....... | G06F 11/3086 709/204 |

(Continued)

Primary Examiner — Richard G Keehn
(74) Attorney, Agent, or Firm — Perkins Coie LLP (57) ABSTRACT

The disclosure is directed to replicating data across multiple computer nodes ("nodes") in a distributed computing system. The data is replicated to a significantly large number of servers in two modes—a pull mode and a push mode. In the push mode, data replication is initiated by a publisher node, which replicates the data to the nodes. In the pull mode, data replication is initiated by a node which pulls the data from one of the nodes. The nodes are deployed as an ephemeral tree structure ("tree") such that data can flow efficiently between nodes of different hierarchical levels of a communication network, e.g., a region, a datacenter, a cluster, and a rack. Data is transmitted across the hierarchical levels from a leader node of one level to a leader node of another level, and from the leader node to the other nodes within the level.

20 Claims, 8 Drawing Sheets (56) References Cited

U.S. PATENT DOCUMENTS

2015/0138977 A1* 5/2015 Dacosta .............. H04W 28/021
370/235
2017/0013058 A1* 1/2017 Annamalai ......... H04L 67/1095

* cited by examiner

DATA REPLICATION USING EPHEMERAL TREE STRUCTURES

BACKGROUND

Some data replication methods replicate data from a read-write primary data storage server computing device ("server") to read-only secondary servers. The primary server and the secondary servers can be located in different geographical regions. One of the characteristics of such a replication method can include a slow write operation if a client computing device ("client") that is writing data to the primary server is located in a geographical region that is different from that of the primary server. Moreover, if the write operation is a synchronous write operation, the client can experience an additional delay, which is incurred in writing the data to the secondary servers. Typically, the client is unaware of why the write operations are slow, which can lead the clients to conclude that the application writing the data is faulty or slow. Increasing the number of secondary servers can increase data availability and/or reliability as a number of replicas of the data increases, but can further increase the delay. Accordingly, the above data replication method is not scalable.

Some data replication methods, e.g., peer-to-peer file sharing networks, are scalable but the delay involved in replicating data to a particular destination can be significant. In a typical peer-to-peer file sharing network, a data file is made available to multiple clients via one or more other peer clients ("peers"). One or more of the peers can act as a seed. Clients can download the file by connecting to seeds and/or other peers. The peer-to-peer file sharing network typically implements a segmented file transfer protocol in which the file being distributed is divided into one or more segments. As each peer receives a new segment of the file, it becomes a source (of that segment) for other peers, relieving the original seed from having to send that segment to every other client wishing a copy. In such file sharing systems, a segment may have to transit many nodes ("computing devices") before a client can receive it. The number of nodes the segment has to be transit before the client can receive it is not fixed and therefore, the time taken to receive the data segment can vary significantly, and cannot be guaranteed. Also, the peer-to-peer file sharing networks are not network topology aware. That is, a first peer may connect to a second peer that is less proximate than a third peer, resulting in higher replication latency. Further, in the peer-to-peer technology each of the peers download the entire file from a seeding peer. The peer-to-peer technology may not make a peer available as a seed if the peer does not have or has not downloaded a copy of the complete file. For example, if a particular computer is connected to five different peers for downloading a file, each of the five peers download the entire file and store it on their disk, resulting in a significant consumption of storage resource of the peers, and can also increase the replication latency as read and/or write latency of a storage disk is significantly high.

Some replication methods that replicate data to a significant number of servers have a limitation on a size of data that can be replicated at a time and the size can be less compared to the amount of data needing to be replicated. This can result in replicating the data multiple times in portions, which increases the time required to replicate the data.

DETAILED DESCRIPTION

Embodiments are disclosed for replicating data across a number of computing devices ("nodes") in a distributed computing system. The embodiments facilitate replicating data to a significantly large number of servers in two modes—a pull mode and a push mode. In the push mode, data replication is initiated by a publisher node, which replicates data to other nodes. In the pull mode, data replication is initiated by a node that requests the data from one of the other nodes. For replicating the data, the nodes are deployed as an ephemeral tree structure ("tree") such that data can flow efficiently between nodes of different hierarchical levels of a communication network of the distributed computing system, e.g., a region, a datacenter, a cluster, and a rack. In some embodiments, a hierarchy of the tree ("tree hierarchy") can represent a hierarchy of the communication network ("network hierarchy"), that is, a hierarchical level of the tree can represent a hierarchical level of the network. The communication network can be organized into hierarchical levels based on a topology of the network, e.g., a region, a datacenter, a cluster, and a rack.

The tree includes a configurable number of nodes in each of the hierarchical levels. In some embodiments, each hierarchical level of the tree includes one of the nodes that is elected as a leader node for the corresponding hierarchical level. The tree propagates the data across hierarchical levels from a leader node of one hierarchical level to the leader node of another hierarchical level and propagates the data within a specified hierarchical level from the leader node to the other nodes in the specified hierarchical level. By ensuring that the nodes within the specified hierarchical level receive the data from a node within the specified hierarchical level, the embodiments can minimize latency in replicating the data to the nodes within the specified hierarchical level. Also, by ensuring that the cross hierarchy data replication is restricted to the leader nodes of the corresponding hierarchical levels, the embodiments can minimize the latency involved in cross hierarchy data replication, which can otherwise be significantly more if the data is also replicated to other nodes (other than the leader nodes) across hierarchy.

In the pull mode, a node can download on demand (e.g., as needed) a specified data file from the distributed computing system. The node determines a leader node of a particular hierarchical level to which the node is assigned, e.g., a rack level, and then downloads the data file from the leader node. If the leader node of the rack level does not have the data file, the leader node contacts the leader node of a parent of the rack level, e.g., cluster level, to obtain the data file. If the cluster level leader node has the data file, the cluster level leader node transmits the data file to the rack level leader node, which then transmits the data file to the requesting node. However, if the cluster level does not have the data file, the request is propagated to a parent of the cluster level and so on until a leader node at one of the hierarchical levels returns the data file. If none of the leaders have the data file, a leader node of the topmost hierarchical level of the tree, e.g., region level node, which can also be a root node of the tree, obtains the data from a source node, e.g., a storage system of the distributed computing system. Once the root node has the data file, the data file is propagated from one leader to another leader down the hierarchy progressively until the data file reaches the leader node of the hierarchical level to which the requesting node is assigned. After the leader node of the hierarchical level to which the requesting node is assigned receives the data file, the leader node transmits the data file to the requesting node.

Further, the leader nodes can store the data file in their cache memory, and transmit the data file to other nodes, including leader nodes, from their cache memory. In some embodiments, transmitting the data file from the cache memory can be faster than transmitting the data from their secondary storage as the secondary storage can have higher read and/or write latencies compared to the cache memory.

In the push mode, a publisher node in the distributed computing system distributes the data file to the nodes. A node publishes a data file or an update to the data file that needs to be distributed to the other nodes to the publisher node, which then distributes the data file using the tree. The publisher node sends the data file to a leader node of the topmost hierarchical level of the tree, e.g., region leader, which can also be the root node of the tree. Once the root node has the data file, the data file is propagated from one leader to another leader down the hierarchy progressively until the data file reaches the leader node of the bottommost hierarchical level of the tree, e.g., rack level. The leader node in each of the hierarchical levels can transmit the data file to the other nodes in the corresponding hierarchical level.

In some embodiments, the mode that is used for replicating the data depends on a type of the data being replicated. For example, if the data to be replicated is a time sensitive data, e.g., an update to the data file is to be made available at the nodes within a specified duration from the data file was updated, the distributed computing system can employ the push mode. An example of such time sensitive data can include financial budget data for serving an online advertisement ("ad") in a social networking application. The remaining budget for serving the ad can change, e.g., as and when a specified node serves an ad impression, and the data regarding the change in budget has to be immediately sent to a number of nodes, e.g., so that the other nodes are aware of the remaining budget to serve the ads accordingly. The nodes can be spread across geographical locations and can be responsible for serving an ad to a user in the corresponding geographical location. For types of data that may not be time-sensitive, the pull mode replication can be employed.

The embodiments also support replicating data using a combination of both the pull and push modes. While the push mode ensures the data is available at the nodes with minimum latency, the push mode can be unreliable at times. For example if one of the nodes of the tree is unavailable, e.g., due to a failure, the node would not receive the data. In some embodiments, the publisher node pushes a data file to a storage system of the distributed computing system in addition to the nodes. The node can obtain the data file by pulling the data file from the storage system, e.g., as described above with reference to the pull mode.

In some embodiments, the tree is generated specific to a data file that is being replicated. For example, the tree for replicating a first data file can be different from a tree for replicating a second data file. In some embodiments, a tree generated for a specific data file can exist as long as the specific data file is being replicated to the target nodes and is dismounted after that; hence the name "ephemeral tree." A tree-management node in the distributed computing system facilitates the formation of a tree for distributing a data file. In some embodiments, a specified node publishes its availability and interest in a specified data file to the tree-management node, which then assigns/registers the specified node to a specified hierarchical level of the tree generated for the data file. In some embodiments, the tree-management node registers the specified node to the specified hierarchical level based on a deployment topology of the distributed computing system. The deployment topology can define a placement of the nodes, e.g., a minimum, maximum and/or a specified number of nodes to be deployed in a specified hierarchical level, e.g., a region, a datacenter, whether the nodes have to be spread across various levels. In some embodiments, the deployment of the nodes in the tree can be very flexible and dynamic. For example, the deployment topology can specify a number of servers to be deployed in one or more hierarchical levels of the tree and the tree-management node ensures that the specified number of servers is deployed in the specified hierarchical level. That is, the deployment topology may not have to define that a specific node has to be deployed in a specific hierarchical level.

The election of the leader node for a specified hierarchical level can be done using various methods. For example, a leader node for a specified hierarchical level is determined using a unique key. In some embodiments, a client portion of the tree-management node 120, e.g., tree-management client, can facilitate the election of the leader. In some embodiments, the tree-client is executing at each of the nodes that participates in data replication in the distributed computing system. Each of the nodes in the specified hierarchical of level, e.g., the tree-management client on each of the nodes, uses this key to identify the leader node in the specified hierarchical level. In some embodiments, the tree-management client on each of the nodes in the specified hierarchical level employs a consistent hashing method to determine the leader of the specified hierarchical level based on the unique key. In some embodiments, the tree-management client on each of the nodes in the specified hierarchical level has a list of the nodes that are part of the specified hierarchical level, e.g., based on the information obtained from the tree-management node, and the tree-management client hashes into this list using the unique key to determine the leader of the specified hierarchical level. In some embodiments, no single node in the tree is aware of the entire tree structure; it may just know the list of nodes in the specified hierarchical level.

The unique key can be determined in different ways for different replication modes. For example, in the pull mode, the key is determined as a function of a filename of the data file being replicated. For example, the key can be a hash value of the filename. In some embodiments, if the data file is being replicated as multiple segments, the key can be a hash value of the filename and an offset of a segment of the data file being replicated. Since the key can be different for segments of the data file, the leaders can be different for replicating different segments and therefore, the tree that is deployed for replicating the different segments can be different.

In the push mode, the key can be determined as a function of a timestamp, a filename, or a combination of the filename and the offset of the segment. In some embodiments, in the push mode, the leader node of a specified hierarchical level can be determined in a random manner. The leader node of the specified hierarchical level can then determine the leader node of its child hierarchical level, e.g., randomly, and so on until the leader of the bottom most hierarchical level is determined.

Figure 1:
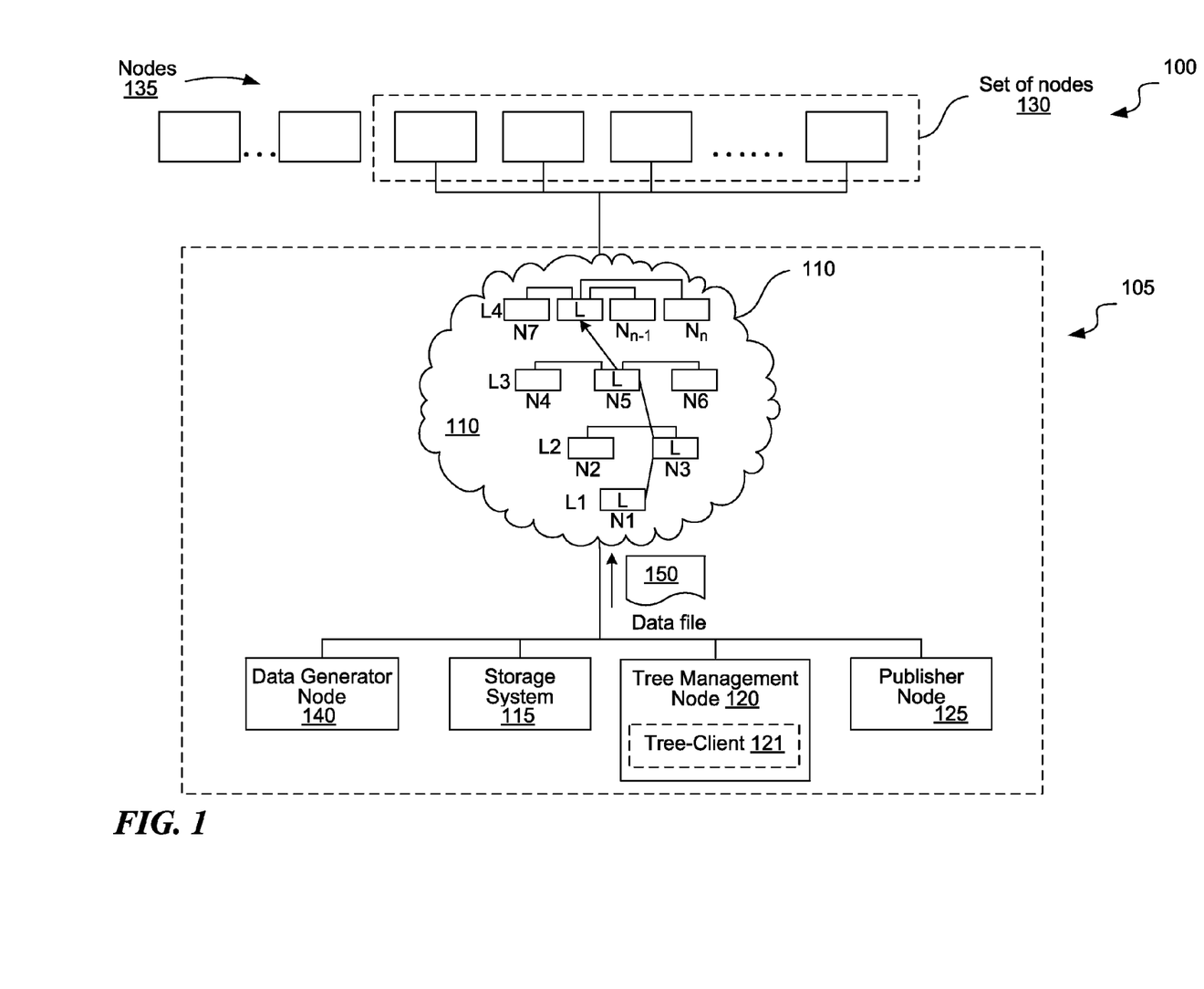
FIG. 1 is a block diagram of an environment in which the disclosed embodiments can be implemented.

Turning now to the figures, FIG. 1 is a block diagram of an environment 100 in which the disclosed embodiments can be implemented. The environment 100 includes a distributed computing system 105 having a number of nodes 135. The nodes 135 can generate and/or consume data in the distributed computing system 105. The distributed computing system 105 includes a storage system 115 that stores data that needs to be distributed to one or more of the nodes 135. In some embodiments, the storage system 115 can be a distributed file system, e.g., Hadoop distributed file system (HDFS). The storage system 115 can store a variety of data associated with the distributed computing system 105, e.g., data that is generated by the one or more of the nodes 135 and data that is generated by a data generator node 140. The data generator node 140 can generate any type of data that may be consumed by the nodes 135. For example, in a social networking application, the data generator node 140 can be an ad publisher node that generates various criteria for serving ads to user devices (not illustrated) of users of the social networking application. The nodes 135 can consume the criteria for serving the ads to the user devices. In some embodiments, the nodes 135 are server computers executing the social networking application. When a user accesses the social networking application, the user accesses one of the nodes 135, and that corresponding node can serve the ad to the user based on the criteria. In some embodiments, the nodes 135 are spread across various geographical locations, and an access request from a user in a specified location is served by one of the nodes 135 in that specified location.

The distributed computing system 105 includes a publisher node 125 that distributes the data to one or more of the nodes 135. The publisher node 125 can obtain the data to be published from the storage system 115 and/or from one of the nodes 135. Continuing with the above example of serving the ads in the social networking application, the data to be published by the publisher node 125 can include budget data for serving an online ad. The remaining budget for serving the ad can change, e.g., decrease as and when one of the nodes 135 serves an ad at a specified price, and the data regarding the change in budget can be transmitted to the other nodes, e.g., so that the other nodes are aware of the remaining budget an can serve the ads accordingly.

The distributed computing system 105 can transmit the data to the nodes 135 by forming an ephemeral tree structure of the nodes 135. In some embodiments, a tree-management node 120 in the distributed computing system 105 facilitates the configuration and/or deployment of the nodes 135 in a tree. In some embodiments, a client portion of the tree management node 120—the tree-management client 121, which is executing in each of the set of the nodes 130, can facilitate the formation of a tree 110 from the set of nodes 130. For example, a set of nodes 130 send an indication to the tree-management node 120, e.g., via the tree-management client 121, for obtaining a data file, e.g., data file 150. The nodes in each of the hierarchical levels identify their peers and elect their leaders, e.g., via tree-management client 121, and form a tree 110 accordingly. The data file 150 can be propagated to each of the set of nodes 130 via the tree 110. In some embodiments, the hierarchy of the tree 110 represents a hierarchy of a communication network using which the data is transmitted to the set of nodes 130. For example, in FIG. 1, the tree 110 has four hierarchical levels and each hierarchical can represent a network hierarchical level, e.g., rack, cluster, data center or a region. In some embodiments, a hierarchical level that contains a root node of a tree is referred to as a first hierarchical level or a topmost hierarchical level of the tree. For example, in the tree 110, the hierarchical level "L1" is the topmost hierarchical level. In some embodiments, a hierarchical level that does not have a child hierarchical level is referred to as a last hierarchical level or a bottommost hierarchical level of the tree. For example, in the tree 110, the hierarchical level "L4," which does not have any child hierarchical level is the bottommost hierarchical level of the tree 110. Additional details with respect to network hierarchies are illustrated at least with reference to FIGS. 2A and 2B below.

The tree 110 propagates the data file 150 across hierarchical levels from a leader node of a hierarchical level to that of another hierarchical level down the hierarchy until the data file 150 reaches the leader node of the bottommost hierarchical level of the tree 110. The tree 110 propagates the data file 150 within a specified hierarchical level by transmitting the data file 150 from the leader node of the specified hierarchical level to the other nodes in the specified hierarchical level.

The tree 110 includes a configurable number of nodes in each hierarchical level. The number of nodes that are deployed in a specified hierarchical level can depend on a deployment topology of the distributed computing system 105.

The distributed computing system 105 supports both the pull mode and the push mode for propagating the data file 150 to the nodes 135. In the pull mode, a node from the set of nodes 130 requests for the data file 150, and in the push mode, the publisher node 125 pushes, e.g., transmits, the data file 150 to the set of nodes 130, e.g., as and when the data file 150 is published to the publisher node 125.

Figure 2A:
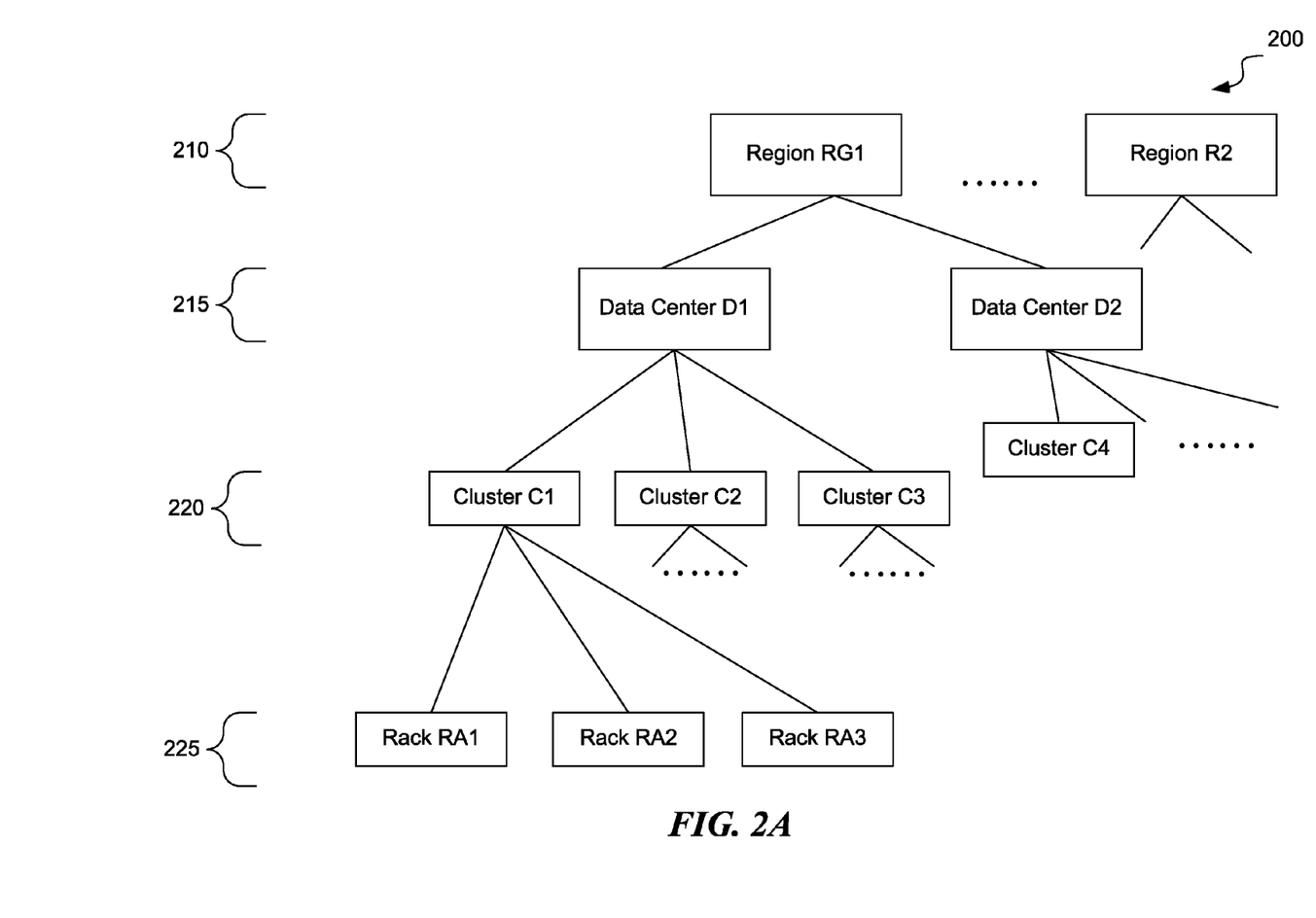
FIG. 2A is a block diagram of a network hierarchy in the distributed computing system of FIG. 1, consistent with various embodiments.

FIG. 2A is a block diagram of a network hierarchy in the distributed computing system of FIG. 1, consistent with various embodiments. In some embodiments, the nodes 130 can be physically located at different locations. For example, a first subset of the nodes 135 can be in a first location, a second subset of the nodes 135 can be in a second location and so on. A location can be one or more of a country, a region of a country, a state, a city, a datacenter, a cluster in a datacenter, a rack in a cluster, or any other user defined location.

In some embodiments, a network hierarchy, e.g., network hierarchy 200, can be determined based a network proximity of the nodes 135. For example, the network hierarchy 200 includes a region, one or more datacenters within a region, one or more clusters within a datacenter and one or more racks within a cluster. In some embodiments, for a node in a specified region, e.g., region "RG1", a node in the datacenter, e.g., datacenter "D1" is more proximate than a node in the cluster, e.g., cluster "C1." That is, in some embodiments, a latency involved in sending data from a node in a region to a node in the datacenter is less than that of in sending the data from a node in a region to a node in the cluster. Accordingly, the network hierarchy 200 can be formed as follows: a first hierarchical level 210 of the network can include one or more regions, e.g., region "RG1" and "RG2," a second hierarchical level 215 of the network, which is a child of the first hierarchical level 210, can include one or more datacenters of the region, e.g., datacenters "D1" and "D2," a third hierarchical level 220, which is a child of the second hierarchical level 215, can include one or more clusters, e.g., clusters "C1," "C2" and "C3" in datacenter "D1" and cluster "C4" in datacenter "D2," and a fourth hierarchical level 225, which is a child of the third hierarchical level 220 and the bottommost hierarchical level of the network hierarchy 200, can include one or more racks, e.g., racks "RA1"-"RA3." While the network hierarchy 200 is based on network proximity, a network hierarchy can be defined based on various other factors.

Figure 2B:
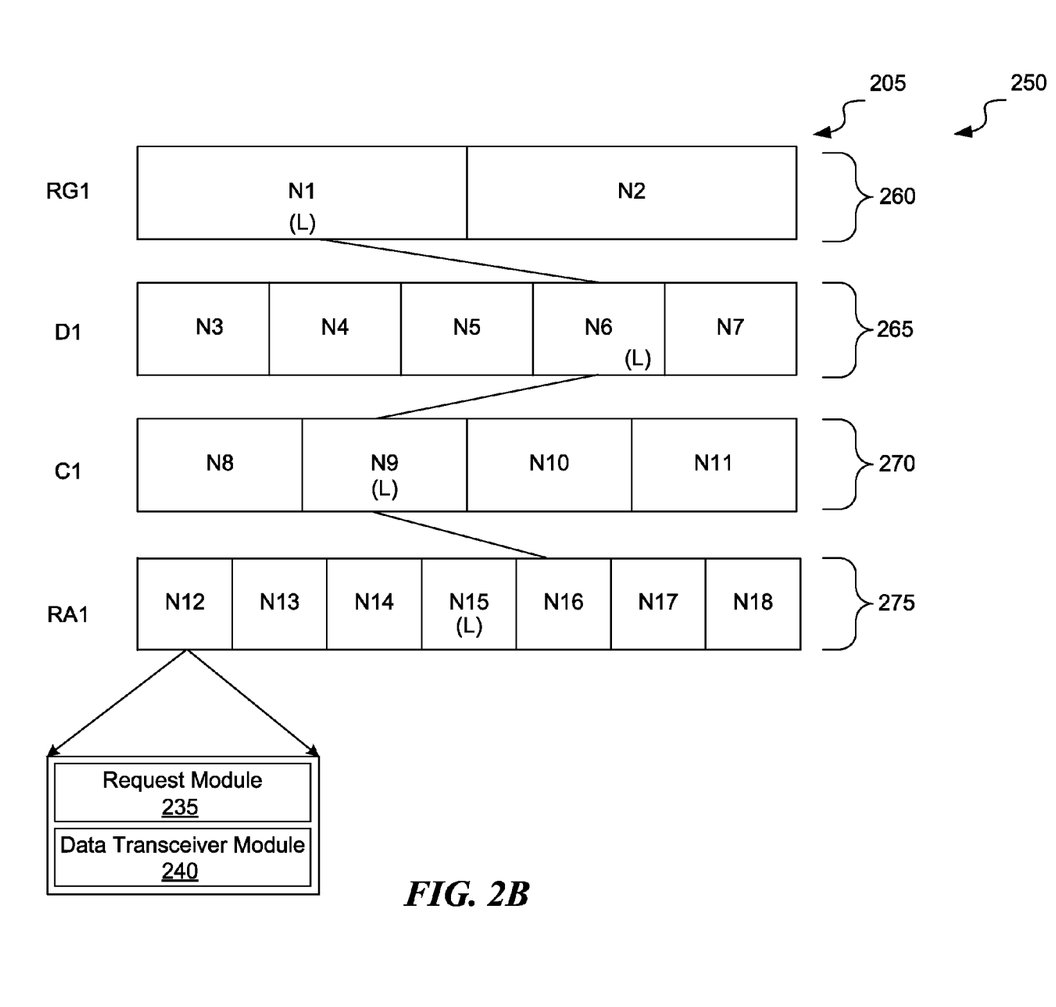
FIG. 2B is a block diagram of an ephemeral tree of a set of nodes, consistent with various embodiments.

FIG. 2B is a block diagram of an ephemeral tree 205 of a set of nodes, consistent with various embodiments. In some embodiments, the tree 205 can be generated in the environment 100 of FIG. 1 and using the set of nodes 130. In some embodiments, the tree 205 can be similar to the tree 110. A hierarchy 250 of the tree 205 (referred to as tree hierarchy 250), can be based on the network hierarchy 200 of FIG. 2. That is, the hierarchical levels 260-275 of the tree 205 can represent the hierarchical levels 210-225 of the network hierarchy 200.

The tree-management node 120 deploys the set of nodes 130 in the tree 205 based on a deployment topology. The deployment topology can define a placement of the nodes in the tree 205, e.g., a number of nodes to be deployed in a specified hierarchical level, whether the nodes have to be spread across various levels. In some embodiments, the deployment of the nodes in the tree can be very flexible and dynamic. For example, the deployment topology can specify a number of nodes to be deployed in one or more hierarchical levels of the tree and the tree-management node 120 ensures that the specified number of nodes is deployed in the specified hierarchical level. That is, the deployment topology may not have to define that a specific node has to be deployed in a specific hierarchical level. Various other policies may be used to specify the deployment of the nodes.

The tree-management node 120 facilitates the formation of a tree for distributing a specific data file. For example, the tree 205 is formed for distributing the data file 150. In some embodiments, a tree formed for replicating a first data file can be different from a tree formed for replicating a second data file. In some embodiments, a specified node publishes its interest in obtaining the data file 150 from the distributed computing system 105 to the tree-management node 120 by sending an indication for downloading the data file 150 to the tree-management node 120 via the tree-management client 121 executing at the specified node. The tree-management node 120 assigns the specified node to a specified hierarchical level of the tree 205. In some embodiments, the tree-management node 120 assigns the specified node to the specified hierarchical level based on the deployment topology. For example, if the deployment topology indicates that a cluster has to have a specified number of nodes and if the cluster already has the specified number of nodes, then the tree-management node 120 can assign the specified node to another hierarchical level, e.g., rack level, and to a specified rack.

In the tree 205, the nodes "N1" and "N2" are assigned to the region level 260, e.g., to region "RG1," the nodes "N3"-"N7" are assigned to the datacenter level 265, e.g., to datacenter "D1," the nodes "N8"-"N11" are assigned to the cluster level 270, e.g., to cluster "C1," and the nodes "N12"-"N18" are assigned to the rack level 275, e.g., to rack "RA1."

Each of the hierarchical levels 260-275 includes a leader node that facilitates the propagation of data file within the tree 205. One of nodes in each of the levels can be elected as a leader node. For example, in the region level 260, the node "N1" is elected as the leader node for the region "R1." Similarly, in the rack level 275, the node "N15" is elected as the leader node. The election of the leader node for a specified hierarchical level can be done by the tree-management client 121 using various methods. A leader node for a specified level is determined using a unique key. The tree-management client 121 executing at each of the nodes in the specified hierarchical level uses this key to identify the leader node in the specified hierarchical level. For example, the tree-management client 121 executing at a node of a specified hierarchical level can obtain the list of nodes in the specified hierarchical level from the tree-management node 120 and hash into the list using the unique key to identify the leader node. In some embodiments, the tree-management client 121 can use known consistent-hashing methods or a variation of the known consistent-hashing methods to determine the leader. The election of the leader can be different for different modes of replication.

The leader nodes facilitate the propagation of the data with the tree 205. The tree 110 propagates the data file 150 across hierarchical levels from a leader node of a hierarchical level to that of another hierarchical level down the hierarchy until the data file reaches the leader node of the bottommost hierarchical level of the tree 110. The tree 110 propagates the data file 150 within a specified hierarchical level by transmitting the data file 150 from the leader node of the specified hierarchical level to the other nodes in the specified hierarchical level.

In some embodiments, a tree formed for replicating a first data file can be different from a tree formed for replicating a second data file. For example, the tree 205 includes nodes "N1"-"N18" for replicating the data file 150. A tree for replicating another data file can include a completely different set of nodes or at least some nodes that are different from the set of nodes. Further, if a data file is replicated as multiple segments, a separate tree can be formed for each of the segments.

A node, e.g., node "N12", can have a request module 235 to request for data, e.g., data file 150, and/or receive a request for data from another node. The node can also have a data transceiver module 240 to send and/or receive the data. In some embodiments, each of the nodes 135 in can have the foregoing modules.

Figure 3:
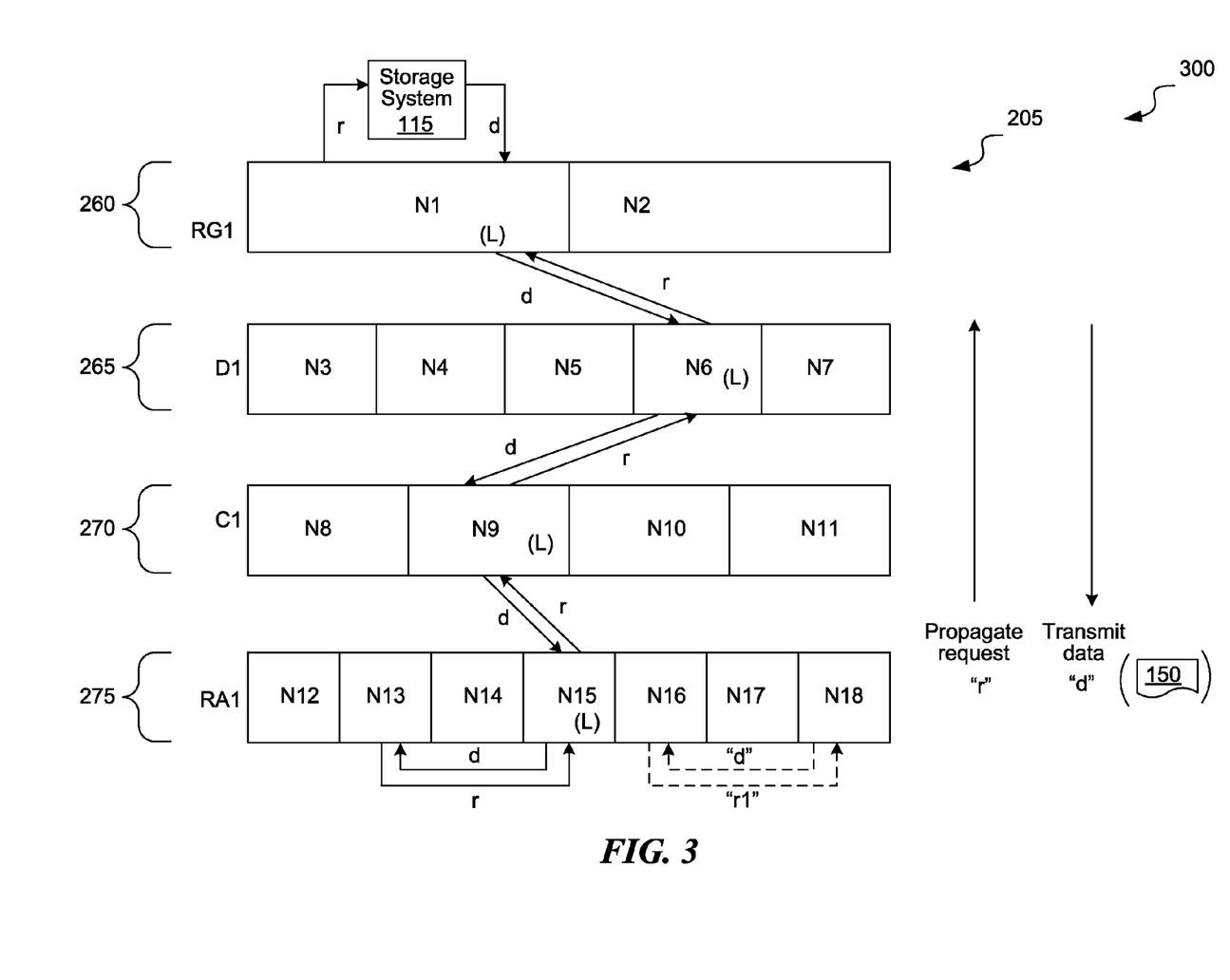
FIG. 3 is a block diagram of an example of replicating data in a tree of FIG. 2B in a pull mode, consistent with various embodiments.

FIG. 3 is a block diagram of an example 300 of replicating data in a tree of FIG. 2B in a pull mode, consistent with various embodiments. In some embodiments, the example 300 can be implemented in the environment 100 of FIG. 1 and using the tree of FIG. 2B. The tree 205 facilitates propagating data to a set of nodes in pull mode. For example, consider that the tree 205 is formed from the set of nodes 130 that have requested to download a data file, e.g., the data file 150. The data file 150 is propagated in the tree 205 using the leader nodes. As described earlier, a leader node of a specified hierarchical level is determined using a unique key. In the pull mode, the key is determined as a function of a filename of the data file 150 being replicated. For example, the key can be a hash value of the filename. In some embodiments, if the data file 150 is being replicated as multiple segments, then a key can be a hash value of the filename and an offset of a segment of the data file being replicated.

In the pull mode, a node obtains the data file 150 by downloading the data file 150. In some embodiments, the node requests a leader node of a hierarchical level to which the node is assigned to transmit the data file 150 to the node. For example, a node "N13" in the rack level 275 sends a request "r" to a leader node of the rack level 275, e.g., node "N15" to transmit the data file to the requesting node "N13." In some embodiments, the requesting node "N13" identifies the leader node of the rack level 275 by obtaining the list of nodes in the rack level 275, e.g., nodes "N12"-"N18," from the tree-management node 120, and hashing into the list using the unique key to obtain the leader node.

If the rack leader "N15" has the data file 150, it transmits the data file 150 (indicated as "d" in FIG. 3") to the requesting node "N13." If the rack leader "N15" does not have the data file 150, the rack leader "N15" propagates the request to a leader node of a parent hierarchical level, e.g., to the leader node "N9" of the cluster level 270. If the cluster leader "N9" has the data file 150, it transmits the data file 150 to the rack leader "N15" which in turn transmits the data file 150 to the requesting node "N13." If the cluster leader "N9" does not have the data file 150, the request is propagated up the hierarchy to a leader node of the next parent hierarchical level and so on until one of the leader nodes transmit the data file or until the request reaches the leader node of the topmost hierarchical level 260, e.g., node "N1." If the region leader "N1" does not have the data file 150, the region leader "N1" requests the storage system 115 for the data file 150. After the region leader "N1" receives the data file 150, the data file 150 is propagated to the leader nodes down the hierarchy progressively until the leader node of the hierarchical level of the requesting node receives the data file 150. For example, the region leader "N1" propagates the data file 150 to the datacenter leader "N6" which then transmits to the cluster leader "N9" which then transmits it to the rack leader "N15." Upon receiving the data file 150 from the cluster leader "N9" the rack leader "N15" transmits the data file 150 to the requesting node "N13."

In some embodiments, the data file 150 is stored in a cache memory associated with the nodes, e.g., as opposed to a secondary storage device, in order to minimize the latency involved in reading from and/or writing to a secondary storage device.

Figure 4:
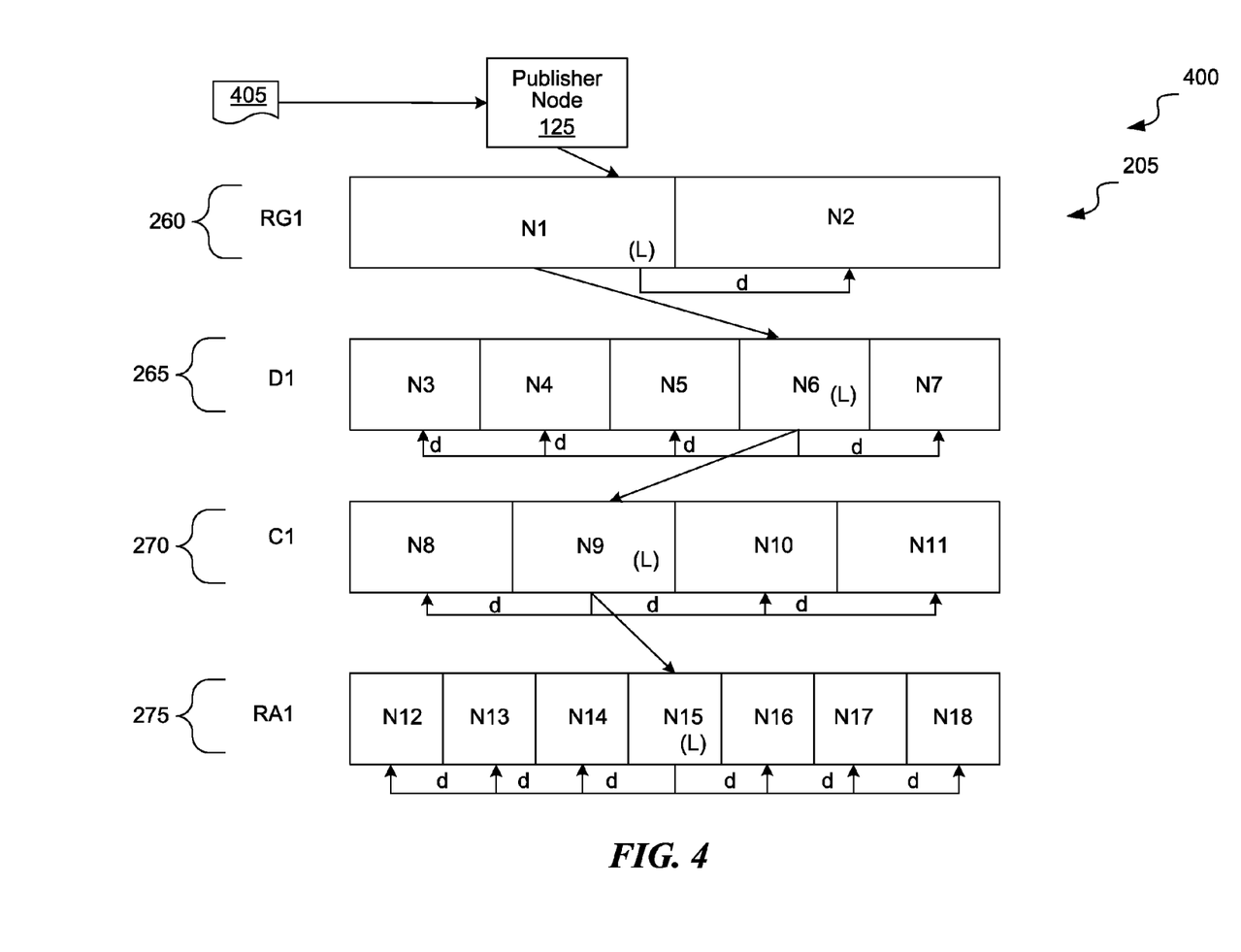
FIG. 4 is a block diagram of an example of replicating data in a tree of FIG. 2B in a push mode, consistent with various embodiments.

FIG. 4 is a block diagram of an example 400 of replicating data in a tree of FIG. 2B in a push mode, consistent with various embodiments. In some embodiments, the example 400 can be implemented in the environment 100 of FIG. 1 and using the tree of FIG. 2B. The tree 205 facilitates propagating data to a set of nodes in push mode. For example, consider that the tree 205 is formed from the set of nodes 130 that have requested for a data file, e.g., the data file 405. The data file 405 is propagated in the tree 205 using the leader nodes. As described earlier, a leader node of a specified hierarchical level is determined using a unique key. In the push mode, the key can be determined as a function of a timestamp, a filename, or a combination of the filename and the offset of the segment if the file is transmitted as multiple segments. In some embodiments, the leader node of a specified hierarchical level is also determined in a random manner.

In some embodiments, the data, e.g., stored in association with data file 405, that need to be immediately shared with the set of nodes 130 is transmitted to the set of nodes 130 using the push mode. Such data is published to the publisher node 125, which distributes it to the set of nodes 130 via the tree 205. In some embodiments, the data file 405 is published to the publisher node 125 by one or more of the nodes 135. In some embodiments, the data file 405 is published to the publisher node 125 by the data generator node 140.

When the publisher node 125 has to push the data file 405 to the tree 205, the publisher node 125 identifies a leader node of the topmost hierarchical level of the tree 205, e.g., leader node "N1" of the region level 260, and transmits the data file 405 to the region leader "N1." The data file 405 is then propagated to the leader nodes down the hierarchy progressively until the leader node of the bottommost hierarchical level receives the data file 405. For example, the region leader "N1" propagates the data file 405 to the datacenter leader "N6" which then transmits to the cluster leader "N9" which then transmits it to the rack leader "N15." Each of the leader nodes can transmit the data file 405 to the other nodes in the corresponding hierarchical level. For example, the datacenter leader "N6" can transmit the data file 405 to the other nodes in the datacenter level 265. The leader node can transmit the data file 405 to the other nodes in the same hierarchical level before, after or in parallel to transmitting the data file 405 to the leader node of the child hierarchical level.

Figure 5:
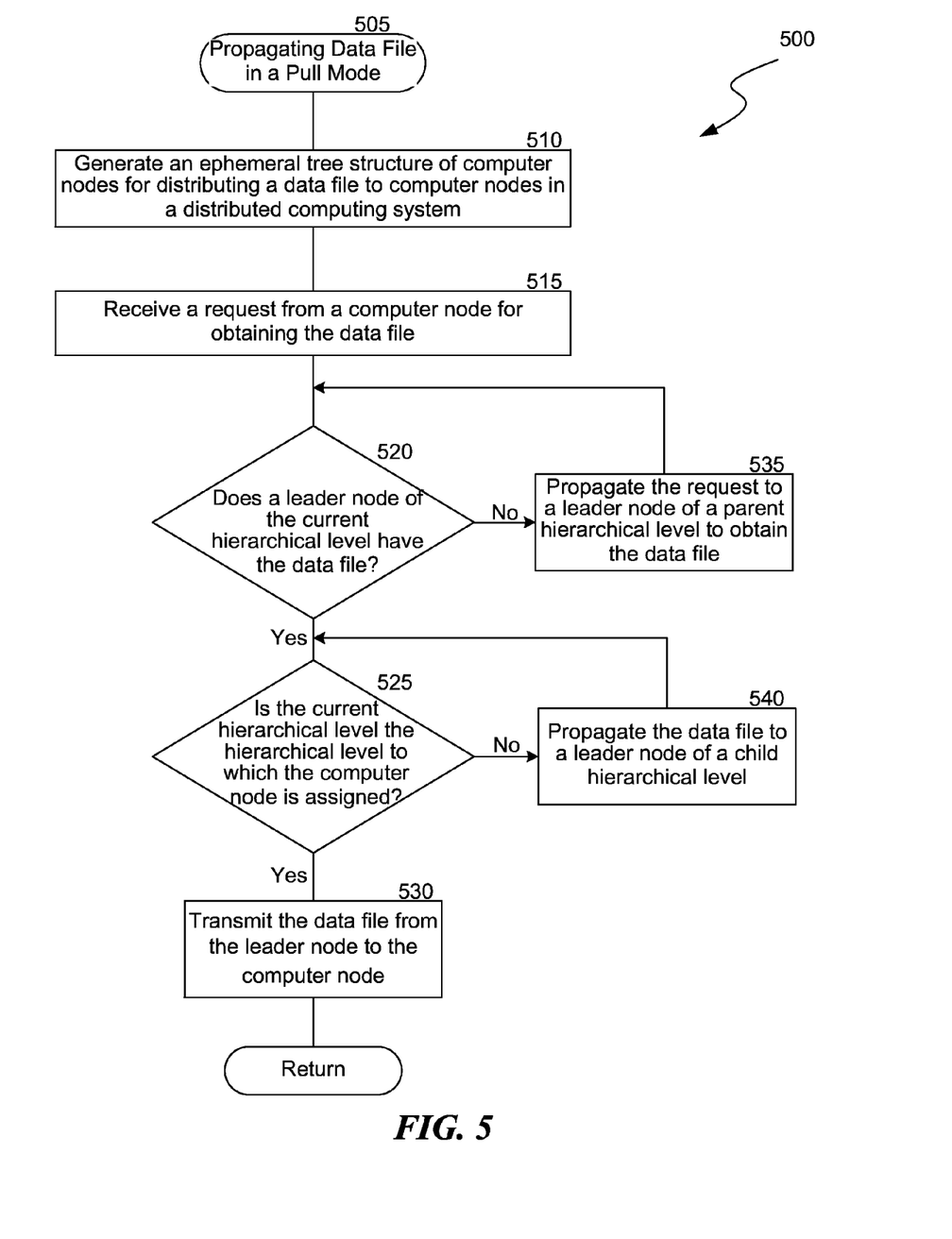
FIG. 5 is a flow diagram of a process of propagating data in a distributed computing system in a pull mode, consistent with various embodiments.

FIG. 5 is a flow diagram of a process 500 of propagating data in a distributed computing system in a pull mode, consistent with various embodiments. In some embodiments, the process 500 may be implemented in the environment 100 of FIG. 1 and using the tree 205 of FIG. 2B. The process 500 begins at block 505, and at block 510, the tree-management node 120 generates an ephemeral tree structure of computer nodes for distributing a data file to the computer nodes. In some embodiments, the set of nodes 130 indicate their interest in downloading a data file, e.g., data file 150, to the tree-management node 120. The tree-management node 120 can facilitate deployment of the set of nodes 130 into the tree 205, e.g., as described at least with reference to FIG. 2B.

At block 515, a request module 235 of a node receives a request from a specified node for a data file from a distributed computing system. In some embodiments, a request for a data file is processed by a leader node of a hierarchical level to which the specified node is assigned. Accordingly, the specified node requests the leader node of the corresponding hierarchical level for the data file. For example, the node "N13" of the rack level 275 requests the rack leader "N15" for the data file. In some embodiments, the specified node identifies the leader node of the corresponding hierarchical level using a unique key, e.g., as described at least with reference to FIG. 3.

At decision block 520, the data transceiver module 240 of the leader node at which the request is received determines whether the leader node has the requested data file. If the leader node has the requested data file, the process 500 proceeds to the decision block 525 for returning the data file to the specified node. On the other hand, if the data transceiver module 240 of the leader node at which the request is received determines that the leader node does not have the requested data file, at block 535, the request is propagated to a leader node of a parent hierarchical level of the leader node at which the request is received. The request for the data file is propagated up the hierarchy progressively from one leader node to another leader node until one of the leader nodes has the data file. For example, if the rack leader "N15" does not have the data file 150, the rack leader "N15" propagates the request to a leader node of a parent hierarchical level, e.g., to the leader node "N9" of the cluster level 270. If the cluster leader "N9" does not have the data file 150, the request is propagated to a leader node of the datacenter hierarchical level 265 and so on. If the request reaches the leader node of the topmost hierarchical level of the tree and the leader node of the topmost hierarchical level does not have the data file, the leader node of the topmost hierarchical level obtains the data file from the storage system of the distributed computing system. For example, the region leader "N1" requests the storage system 115 for the data file 150.

After a leader of a specified hierarchical level indicates that the data file is available, at determination block 525, the request module 235 of the leader node determines whether the specified node that requested the data file is assigned to the same hierarchical level as the leader node. If the specified node is assigned to the same hierarchical level as the leader node, at block 530, the data transceiver module 240 of the leader node transmits the data file to the specified node. For example, if the rack leader "N15" has the requested data file 150, then the rack leader "N15" transmits the data file 150 to the requesting node "N13."

On the other hand, if the request module 235 of the leader node determines that the specified node is not of the same hierarchical level as the leader node, at block 540, the data transceiver module 240 of the leader node propagates the data file to a leader node of a child hierarchical level. The data file is propagated to the leader nodes progressively down the hierarchy until the leader node of a hierarchical level to which the specified node is assigned receives the data file. For example, if requesting node is node "N13" at the rack level 275, and the region leader "N1" at region level 260 has the data file 150, the region leader "N1" propagates the data file 150 to the datacenter leader "N6" which then transmits to the cluster leader "N9" which then transmits it to the rack leader "N15." Upon receiving the data file 150 from the cluster leader "N9," at block 530, the rack leader "N15" transmits the data file 150 to the requesting node "N13" and the process returns.

Figure 6:
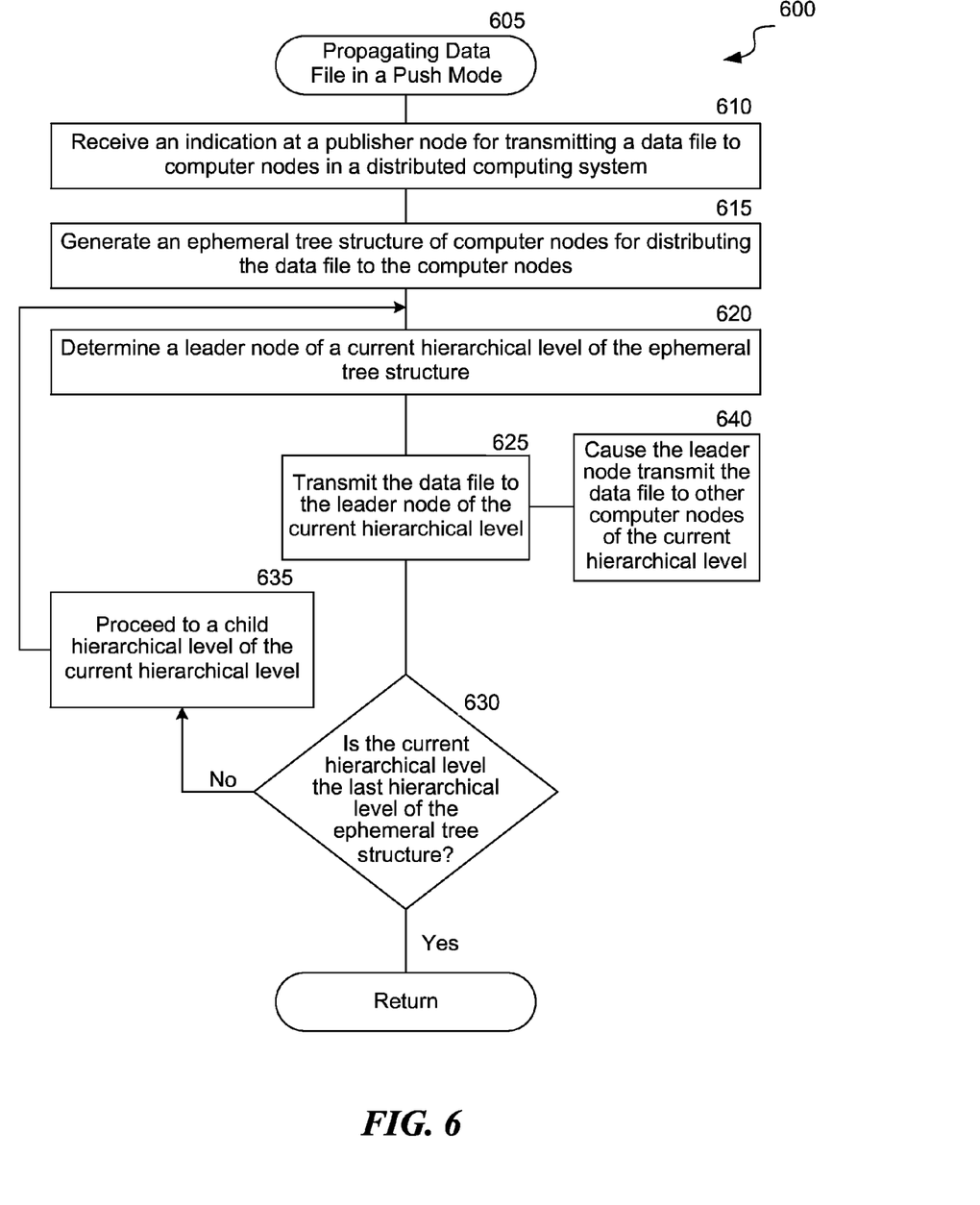
FIG. 6 is a flow diagram of a process of propagating data using in a distributed computing system in a push mode, consistent with various embodiments.

FIG. 6 is a flow diagram of a process 600 of propagating data using in a distributed computing system in a push mode, consistent with various embodiments. In some embodiments, the process 600 may be implemented in the environment 100 of FIG. 1 and using the tree 205 of FIG. 2B. The process 600 begins at block 605, and at block 610, the publisher node 125 receives an indication for propagating a data file, e.g., data file 405 of FIG. 4, to the nodes 135. In some embodiments, the publisher node 125 receives the data file from one of the nodes 135 or from the data generator node 140.

In some embodiments, the set of nodes 130 indicate their interest in the data file to the tree-management node 120. At block 615, the tree-management node 120 facilitates generation of an ephemeral tree structure of computer nodes for distributing the data file to the computer nodes. For example, the tree-management client 121 facilitates deployment of the set of nodes 130 into the tree 205, e.g., as described at least with reference to FIG. 2B.

At block 620, the tree-management client 121 executing at the publisher node 125 determines a leader node of a current hierarchical level, e.g., topmost hierarchical level, of the tree 205. In some embodiments, the tree-management client 121 executing at the publisher node 125 determines the leader node of the corresponding hierarchical level using a unique key, e.g., as described at least with reference to FIG. 4.

At block 625, the publisher node 125 transmits the data file to the leader node of the current hierarchical level. For example, the publisher node 125 transmits the data file 405 to the region leader "N1."

At determination block 630, a data transceiver module 240 of a leader node of the current hierarchical level determines whether the current hierarchical level is the bottommost hierarchical level, e.g., rack level 275, of the tree 205.

If the current hierarchical level is the bottommost hierarchical level, the process 600 returns. On the other hand, if the current hierarchical level is not the bottommost hierarchical level, at block 635, the data transceiver module 240 proceeds to a leader node of a child hierarchical level of the current hierarchical. The control is then transferred to block 620 to continue the process 600 for propagating the data file down the hierarchy of the tree 205 to the remaining hierarchical levels progressively. For example, if the region leader "N1" at region level 260 receives the data file 150 from the publisher node 125, the region leader "N1" then identifies the datacenter leader, e.g., node "N6," and propagates the data file 150 to the datacenter leader "N6," which then identifies the leader node of the cluster level 220 and transmits to the cluster leader "N9", which then identifies the rack leader "N15" and transmits it to the rack leader "N15."

Referring back to block 625, a leader node of a specified hierarchical level upon receiving the data file 150 transmits the data file 150 to the other nodes in the specified hierarchical level (block 640). The leader node can transmit the data file 150 to other nodes in the specified hierarchical level before, after, or in parallel to transmitting the data file to the leader node of the child hierarchical level.

Further, at block 625, the entity transmitting the data file to a leader node of a specified hierarchical level of the tree 205 is determined based on the specified hierarchical level. In some embodiments, if the hierarchical level is the topmost hierarchical level of the tree 205, then the data file is transmitted from the publisher node 125 to a leader node of the topmost hierarchical level. In some embodiments, if the hierarchical level is other than topmost hierarchical level of the tree 205, then the data file is transmitted from a leader node of a parent of the specified hierarchical level.

Figure 7:
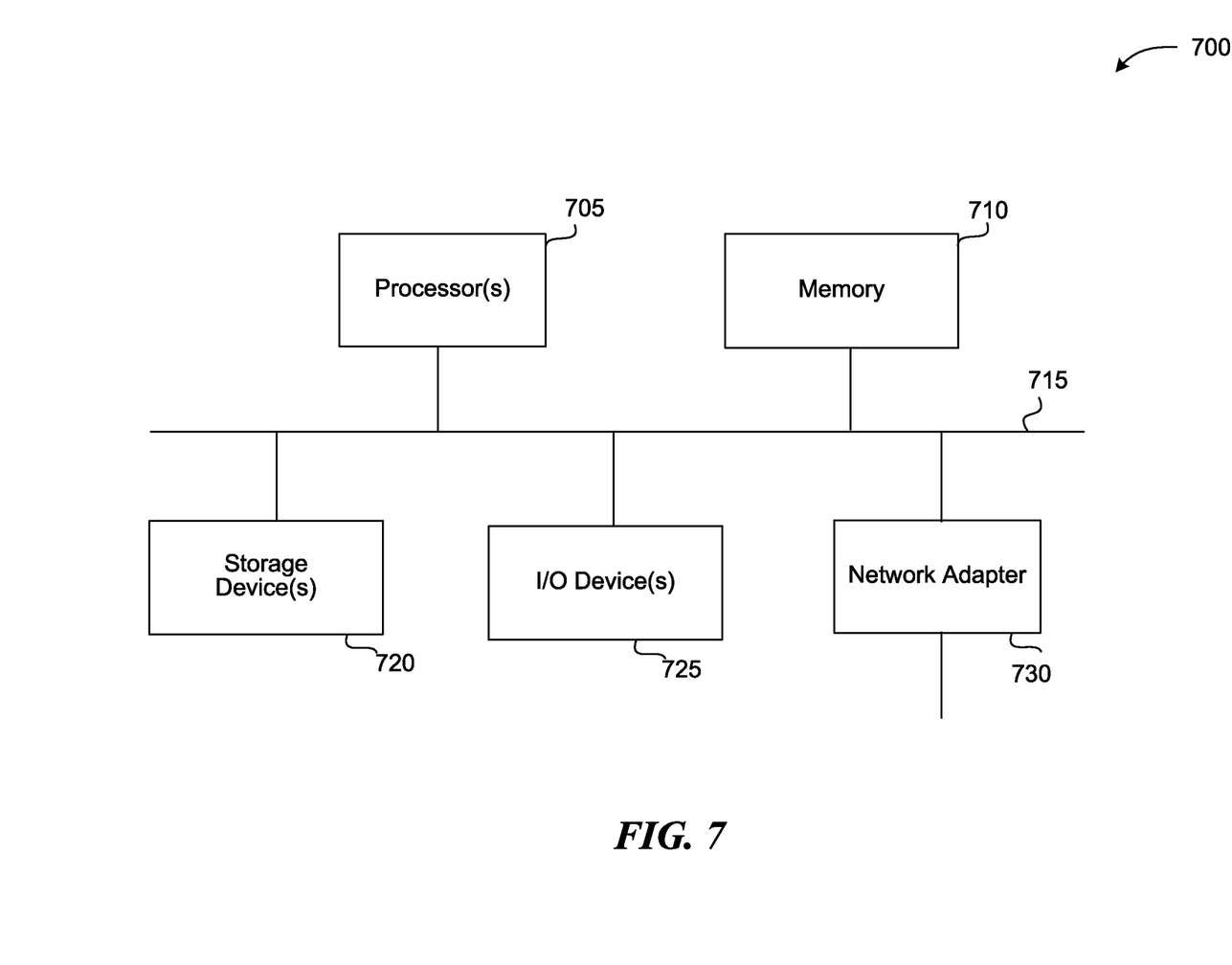
FIG. 7 is a block diagram of a processing system that can implement operations, consistent with various embodiments.

FIG. 7 is a block diagram of a computer system as may be used to implement features of the disclosed embodiments. The computing system 700 may be used to implement any of the entities, components or services depicted in the examples of the foregoing figures (and any other components and/or modules described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments.

In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:

generating an ephemeral tree structure of multiple computer nodes for propagating a data file, the ephemeral tree structure having multiple hierarchical levels, the hierarchical levels indicating a network hierarchy of a distributed computing system, each of the hierarchical levels having one of the computer nodes that is elected as a leader node for the corresponding hierarchical level, wherein the leader node of the corresponding hierarchical level is elected by selecting one of the computer nodes in the corresponding hierarchical level based on a key, the key determined as a function of a filename of the data file or a timestamp, wherein the data file is to be propagated in the ephemeral tree structure by transmitting the data file from a leader node of one of the hierarchical levels to a leader node of another of the hierarchical levels;

receiving a request to transmit the data file to a computer node of the computer nodes, the computer node being in a specified hierarchical level of the hierarchical levels; and transmitting, from a leader node of the specified hierarchical level, the data file to the computer node.

2. The method of claim 1, wherein transmitting the data file includes:

in an event the leader node of the specified hierarchical level does not have the data file, propagating, until the request reaches a root node of the ephemeral tree structure or one of the leader nodes in the ephemeral tree structure that has the data file, the request for the data file up the hierarchical levels from the leader node of the specified hierarchical level to a leader node of an hierarchical level that is a parent of the specified hierarchical level successively.

3. The method of claim 2, wherein propagating the request includes:

in an event none of the leader nodes or the root node of the ephemeral tree structure has the data file, requesting, by the root node, the data file from a source computer node in the distributed computing system.

4. The method of claim 3 further comprising:

in response to receiving the request from the root node, transmitting the data file from the source node to the root node, the root node being a leader node of a first hierarchical level of the hierarchical levels;

propagating successively the data file across the hierarchical levels by sending the data file from a leader node of a current hierarchical level to a leader node of another hierarchical level that is a child of the current hierarchical level until the leader node of the specified hierarchical level receives the data file.

5. The method of claim 1, wherein transmitting the data file from the leader node of the specified hierarchical level includes:

transmitting the data file from a cache memory of the leader node of the specified hierarchical level to the computer node.

6. The method of claim 1, wherein receiving the request for transmitting the data file includes receiving the request from the computer node at the leader node of the specified hierarchical level for transmitting the data file.

7. The method of claim 6, wherein receiving the request at the leader node of the specified hierarchical level includes:

identifying, by the computer node, the leader node of the specified hierarchical level using a key that is determined as a function of the data file.

8. The method of claim 7, wherein the key is determined as a function of a filename of the data file.

9. The method of claim 1, wherein transmitting the data file from the leader node of the specified hierarchical level includes propagating the data file from a source computer node to the computer nodes as multiple segments.

10. The method of claim 9, wherein transmitting the data file as the segments includes:

generating different ephemeral tree structures for transmitting different segments of the data file, wherein a first set of the computer nodes in a given hierarchical level of a first ephemeral tree structure of the ephemeral tree structures is different from a second set of the computer nodes in a given hierarchical level of a second ephemeral tree structure of the ephemeral tree structures.

11. The method of claim 10, wherein the first ephemeral tree structure is configured to propagate a first segment of the segments and the second ephemeral tree structure is configured to propagate a second segment of the segments.

12. The method of claim 10, wherein generating the different ephemeral tree structures includes:

identifying a leader node at the given hierarchical level of the first ephemeral tree structure using a key that is determined as a function of a filename of the data file and an offset of a first segment of the segments the first ephemeral tree structure is configured to propagate.

13. The method of claim 1, wherein generating the ephemeral tree structure of the computer nodes includes:

indicating by a specified computer node of the computer nodes to a tree-generation computer that the specified computer node intends to access the data file, determining, by the tree-generation computer, a third specified hierarchical level of the hierarchical levels to which the specified computer node is to be assigned, and assigning the specified computer node to the third specified hierarchical level.

14. The method of claim 1, wherein receiving the indication for transmitting the data file includes receiving the data file from a specified computer node of the computer nodes at a publisher node for distribution to the computer nodes.

15. The method of claim 14, wherein transmitting the data file to the computer node includes:

propagating the data file to the computer nodes across the hierarchical levels by:

sending the data file from the publisher node to a leader node of a first hierarchical level of the hierarchical levels, sending the data file from a leader node of a current hierarchical level to a leader node of a next hierarchical level that is a child of the current hierarchical level until the leader node of a last hierarchical level of the hierarchical levels receives the data file.

16. The method of claim 15, wherein sending the data file from a leader node of the current hierarchical level to a leader node of the next hierarchical level further includes sending the data file by the leader node in the current hierarchical level to a set of the computer nodes in the current hierarchical level.

17. A non-transitory computer-readable storage medium storing computer-readable instructions, comprising:

instructions for receiving a data file, at a publisher node from a computer node, for distribution to multiple computer nodes in a distributed computing system;

instructions for generating an ephemeral tree structure of the computer nodes, the tree structure having multiple hierarchical levels, the hierarchical levels indicating a network hierarchy of the distributed computing system, each of the hierarchical levels having one of the computer nodes that is elected as a leader node for the corresponding hierarchical level, wherein the ephemeral tree structure is different for different data files, and wherein a leader node of a specified hierarchical level is elected by selecting one of the computer nodes in the specified hierarchical using a key, the key determined as a function of a filename of the data file or a timestamp; and instructions for propagating the data file to the computer nodes across the hierarchical levels by transmitting the data file from the publisher node to a leader node of a first hierarchical level of the hierarchical levels, and transmitting the data file from a leader node of a current hierarchical level of the hierarchical levels to a leader node of a next hierarchical level of the hierarchical levels that is a child of the current hierarchical level until the leader node of a last hierarchical level of the hierarchical levels receives the data file.

18. The non-transitory computer-readable storage medium of claim 17, wherein the instructions for transmitting the data file from the leader node of the current hierarchical level to the leader node of the next hierarchical level further include:

instructions for sending the data file by the leader node in the current hierarchical level to a set of the computer nodes in the current hierarchical level.

19. The non-transitory computer-readable storage medium of claim 17, further comprising:

instructions for transmitting the data from the publisher node to a storage system; and instructions for causing a specified computer node to obtain the data from the storage system, the specified computer node being one of the computer nodes that did not receive the data file from a leader node of a hierarchical level of the hierarchical levels to which the specified computer node belongs.

20. A system, comprising:

a processor;

a memory;

a tree management node configured to generate an ephemeral tree structure of computer nodes in a distributed computing system, the ephemeral tree structure configured to propagate a data file to the computer nodes, the ephemeral tree structure having multiple hierarchical levels, the hierarchical levels indicating a network hierarchy of the distributed computing system, each of the hierarchical levels having one of the computer nodes that is elected as a leader node for the corresponding hierarchical level, wherein the leader node for the corresponding hierarchical level is elected by selecting one of the computer nodes in the corresponding hierarchical level using a key, the key determined as a function of a filename of the data file or a timestamp, wherein the ephemeral tree structure is configured to propagate the data file from a leader node of a current hierarchical level of the hierarchical levels to leader nodes of remaining of the hierarchical levels that are children of the current hierarchical level progressively;

a request module configured to receive a request from a computer node of the computer nodes for obtaining the data file, the second module further configured to receive the request at a leader node of a specified hierarchical level to which the computer node belongs; and a data transceiver module configured to transmit the data file to the computer node from the leader node of the specified hierarchical level.

* * * * *